United States Patent

[11] 3,573,767

[72] Inventors Richard O. McCary; Fred E. Luborsky, Schenectady, N.Y.
[21] Appl. No. 779,401
[22] Filed Nov. 27, 1968
[45] Patented Apr. 6, 1971
[73] Assignee General Electric Company

[54] ELECTRON BEAM READOUT OF MAGNETIC STORAGE DISK

18 Claims, 5 Drawing Figs.

[52] U.S. Cl. 340/174.1, 179/100.2, 346/74
[51] Int. Cl. G11b 5/32
[50] Field of Search 179/100.2 (C); 340/174.1 (F), 174.1 (MO); 346/74 (EB), 74 (ESB), 74 (M), 74 (MC); 178/6.6 (A)

[56] References Cited

UNITED STATES PATENTS

| | | | |
|---|---|---|---|
| 3,124,790 | 3/1964 | Kuehler | 179/100.2 |
| 3,228,015 | 1/1966 | Miyara et al. | 340/174.1 |
| 3,287,709 | 11/1966 | Moulton | 346/74 |
| 3,317,713 | 5/1967 | Wallace | 346/74 |

*Primary Examiner*—Terrell W. Fears
*Assistant Examiner*—Vincent P. Canney
*Attorneys*—Richard R. Brainard, Marvin Snyder, Paul A. Frank, Frank L. Neuhauser, Oscar B. Waddell and Melvin M. Goldenberg

ABSTRACT: A rotating disc coated with a thin magnetic film is used in a vacuum system as a high density data storage medium. A group of magnetic recording heads, overlapped in stairstep fashion, are actuator-positioned so that one complete band of tracks may be recorded in a single revolution of the disc. Interrogation is accomplished by controllably deflecting an electron beam in a radial direction toward any predetermined track. The electron beam is reflected by an electric potential on the disc surface and deflected by the magnetic field just above the surface. Differential sensing of reflected current allows determination of the stored information.

Inventors:
Richard O. McCary,
Fred E. Luborsky,
by Marvin Snyder
Their Attorney.

Inventors:
Richard O. McCary,
Fred E. Luborsky,
by Marvin Snyder
Their Attorney.

ELECTRON BEAM READOUT OF MAGNETIC STORAGE DISK

This invention relates to data storage apparatus and more particularly to apparatus in which data is stored electromagnetically and read out by interacting an electron beam with the magnetic field on the magnetically recorded disc.

In conventional magnetic recording, the density of data which can be stored is not limited by the recording or writing process but is limited by the readout apparatus. With conventional heads and metallic films, storage densities of $10^7$—$10^8$ bits per square inch have been achieved. This permits the surface of a 14-inch diameter disc to store about $10^{10}$ bits. However, with conventional magnetic readout apparatus, maximum readout density is about $10^6$ bits per square inch, limiting useful storage on 14-inch discs to about $10^8$ bits per square inch.

The present invention contemplates recording at bit densities such as those which have been attained by employment of conventional heads combined with an electron beam readout apparatus to achieve readout resolution comparable to the recorded density. To achieve the necessary high rate of recording a group of heads are to be used simultaneously to write one complete band in a single revolution of the disc. To accomplish this objective, the magnetic heads may be several mils wide if necessary, but overlapped in a stairstep manner so that each projects only about 1.5 microns beyond its predecessor. To ensure sharp demarcation between recorded tracks, an odd number of heads, each with a single gap, are employed. The first, last, and every alternate intervening head are used to erase only.

Conventional access time to a given track of magnetic recording discs is relatively slow; that is, when a single pickup head is employed, it must be positioned precisely in alignment with the recorded track to be read out. This is a relatively slow process typically requiring tens of milliseconds. Because mechanical positioning is also subject to backlash, not much reliance can be placed on the accuracy of any mechanical positioning system, thereby limiting the possible track density. Moreover, as the system is used and the mechanical parts wear, the problems of backlash may become intolerable.

By employment of an electron beam for reading out recorded information, problems introduced by mechanical apparatus, such as the slow access time to each track and limited track density due to backlash and positioning accuracy, are completely obviated. Rapid selection of any desired track may be made by positioning the electron beam on the desired track merely by selecting proper control potentials for the apparatus. Thus, the access time to any track is essentially zero and access time to any bit in the track is determined essentially by disc rotational speed without adding any actuator operating time.

Accordingly, one object is to provide apparatus which records data magnetically at high density and has a readout density capability high enough to be compatible with the recording density.

Another object of the invention is to provide apparatus for recording data magnetically at high speed and providing high speed random access to each track for retrieval of the stored data.

Another object is to provide apparatus for recording data simultaneously from a plurality of channels and permitting rapid retrieval of the data furnished from any desired one of the channels.

Another object is to provide apparatus for recording data magnetically at high density and for retrieving selected data from storage rapidly by an electron mirror method.

Briefly, in accordance with a preferred embodiment of the invention, data storage and readout apparatus comprise a rotatable disc coated with an electrically conductive, thin magnetic film of high coercive force, and means for surrounding the film with an electric field by applying a negative electrical bias to the film. Magnetic transducer means are positioned to produce a magnetic field upon the film coated on the disc. An incident electron beam is directed toward the film coated on the disc, and means are provided for controllably deflecting the electron beam in a radial direction with respect to the disc. Detection means are provided for determining the position of the electron beam reflected by the electric field surrounding the film and deflected by the magnetic field emanating from the film.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
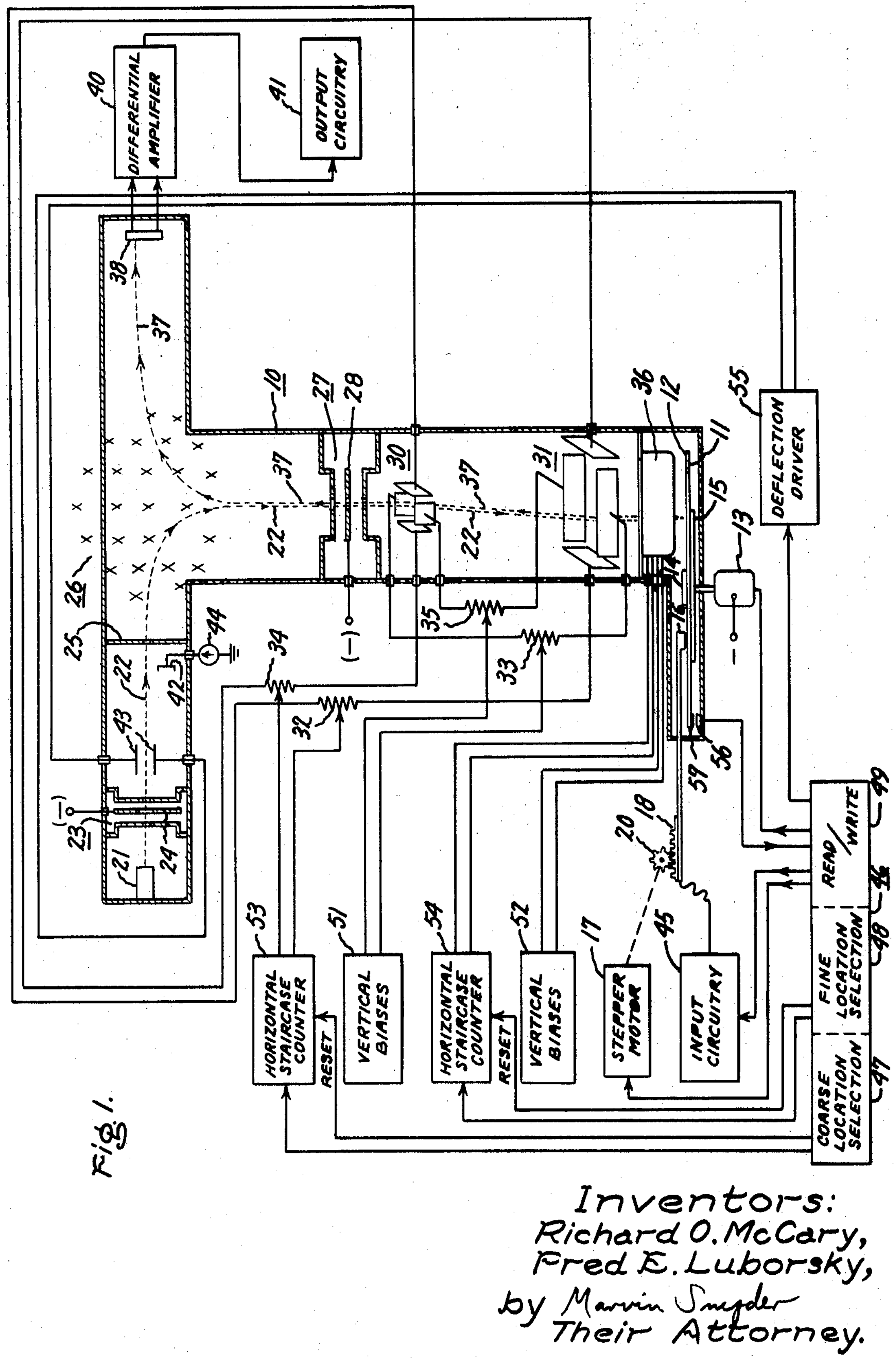
FIG. 1 is a schematic diagram of the data storage and readout apparatus of the present invention.

In FIG. 1, a vacuum enclosure 10 is shown containing at one end a magnetic recording disc 11 having a metallic film 12 of high coercive force, such as a cobalt-nickel alloy containing up to about 5 percent phosphorus by weight, coated thereon. Typical metallic film coercive forces are in the range of 100-—1,000 oersteds. The disc is driven by a synchronous motor 13, which may be situated either outside enclosure 10, as shown, or inside the enclosure. Motor 13 is continuously driven at constant speed during both recording and readout operation. Disc 11 is securely fastened to the shaft of motor 13 between a capping member 14 and a turntable member 15. Recording is accomplished with magnetic transducer apparatus 16 which is positionable from a stepper motor 17 through gearing such as a rack 18 and pinion 20. The gearing and stepper motor may be situated either outside enclosure 10 as shown, or inside the enclosure.

At one side of the opposite end of evacuated chamber 10, an electron emitter 21 is shown producing an incident beam of electrons 22. This beam is collimated by an electron condenser lens 23 having its central apertured plate 24 connected to a source of negative potential, while the outer apertured plates of condenser lens 23 are grounded through the outer wall of chamber 10. The effect of condenser lens 23 is such as to modify the electron trajectories by bending the paths of electrons during their passage through the condenser lens so as to bring a group of divergent electron paths into a beam of substantially parallel or slightly convergent paths.

The cross-sectional area of electron beam 22 may be conveniently shaped into any desired configuration by passing the beam through a plate 25 containing a correspondingly shaped aperture therein. The beam then enters a magnetic field 26 directed perpendicularly to the direction of travel of incident electron beam 22. This field may be produced by a permanent magnet or electromagnet (not shown) situated either inside or outside of vacuum enclosure 10. The purpose of this magnetic field is to turn an electron beam in a desired direction. Thus, if the magnetic field is directed into the plane of the illustration as shown in FIG. 1, beam 22 turns in the direction indicated. Incident beam 22 then passes through a second collimating electron lens 27 having a central apertured plate 28 connected to a source of negative potential, while the outer apertured plates of condenser lens 27 are grounded through the outer wall of housing 10.

Coarse deflection of incident electron beam 22 is accomplished by applying precise deflection voltages to two sets of deflection electrodes 30 and 31 situated within enclosure 10. Each of coarse deflection electrodes 30 and 31 comprises two pairs of mutually orthogonal electrostatic deflection plates although, if preferred, electromagnetic deflection means may be utilized instead of electrostatic deflection means. Electrostatic deflection electrodes 30 and 31 are interconnected through a plurality of resistances 32, 33, 34 and 35, which may conveniently comprise potentiometers. Through these resistances, opposite deflection plates of each one of deflection means 30 and 31 receive voltages of the same polarity, although of relative amplitudes determined by the setting of the centertap on the potentiometer interconnecting each pair of opposite plates. Electrical interconnection of opposite plates causes electron deflection in opposite directions at each of deflection means 30 and 31, so that incident electron beam 22 impinges only orthogonally upon the lenslets of a matrix 36 of electron lenses or lenslets arranged in rows and columns. This lens matrix, designated a Fly's Eye lens, is described in detail in S. P. Newberry, Pat. Ser. No. 671,353, filed Sept. 28, 1967, and assigned to the instant assignee. Although the Fly's Eye lens is a two-dimensional matrix of lenses, only a single row of lenses is actually required in the system.

When incident electron beam 22 impinges upon a lenslet in matrix 36, the beam is deflected according to horizontal and vertical deflection voltages supplied to the matrix. These horizontal and vertical deflection voltages are furnished in common to a unique pair of horizontal and vertical deflection electrodes respectively for each of the lenslets of the matrix, as described in detail in the aforementioned Newberry application. Thus, once the coarse deflection means comprising deflection electrodes 30 and 31 have deflected incident electron beam 22 onto any particular lenslet of matrix 36, the horizontal and vertical voltages furnished to that lenslet direct the electron beam precisely toward a predetermined point above recording surface 12 of disc 11. Since it is desired to move the electron beam in but a single linear direction, such as in the horizontal direction, the incident electron beam may be precisely positioned along a horizontal dimension while maintaining the beam at a constant vertical position. It should be noted that the horizontal dimension is aligned along a radial direction with respect to disc 11, while the vertical dimension is aligned along a tangential direction with respect to disc 11. Thus, selection of any particular track on disc 11 to be read out is made by merely altering the radial deflection of the incident electron beam.

A negative potential is applied to the housing of motor 13, which then appears on coating 12 through cap 14 and the shaft of motor 13. This potential, which is negative with respect to electron emitter 21, produces the so-called electron mirror effect, causing electrons to be repelled by the negative potential on the coating. Because of this effect, the incident electron beam turns back almost exactly upon itself, returning through the same lenslet of matrix 36 from whence it came and passing through coarse deflection electrodes 30 and 31 as a reflected electron beam 37. Beam 37 passes through collimating lens 37 and, upon entering magnetic field 26, is turned and directed toward electron detecting means 38 conveniently comprising a pair of circumferential collection plates which are preferably of coplanar semicircular configuration. Differential sensing of the current received at circumferential electron collection plates 38, by means of a differential amplifier 40, allows determination of the stored information.

A Faraday cup 42 is provided between electron lens 23 and apertured plate 25 for the purpose of intercepting incident electron beam 22 from electron emitting means 21 when no exposure of surface 12 on disc 11 by the electron beam is desired. During this time, the electron beam is deflected away from the aperture in plate 25 by a pair of electrostatic deflection plates 43, to the Faraday cup which is grounded through a beam current meter 44 providing visual indication of beam current flow through the cup. Electrons emitted from electron source 21 thus are collected by the Faraday cup until exposure of surface 12 to the electron beam is once again called for. This method of turning the beam on and off is highly stable. Alternatively, other means of turning the incident electron beam on and off, such as conventional grid modulation, may be utilized.

Data to be recorded on disc 11 are supplied through transducer means 16 from input circuitry 45, which may comprise computer peripherals (for example, magnetic tape), a computer memory, input apparatus generating a code such as ASCII(American Standard Code for Information Interchange, promulgated by the American Standards Association), etc. Output data are furnished from differential amplifier 40 to output circuitry 41, such as the buffer storage of a computer.

Control of the electron beams within enclosure 10 is accomplished with control apparatus 46 which may comprise, for example, manually selectable controls, operating in conjunction with preset vertical biases 51 and 52. Control apparatus 46 includes coarse location selection circuitry 47 which produces an output signal that triggers a horizontal staircase counter 53 into operation, and fine location selection circuitry 48 which produces an output signal that triggers a horizontal staircase counter 54 into operation. Staircase counters 53 and 54 each generate a voltage which increases by equal increments at times controlled by input pulses from coarse location circuitry 47 and fine location selection circuitry 48, respectively, and both staircase counters are resettable upon receipt of a reset signal from coarse location selection circuitry 47 and fine location selection circuitry 48, respectively.

Output signals from horizontal staircase counter 53 are supplied to the centertaps of potentiometers 34 and 32, while output signals from horizontal staircase counter 54 are furnished to vertically directed electrodes in lens matrix 36 so as to deflect electrons in the horizontal direction, the horizontal and vertical directions being oriented parallel to the plane of disc 11. Vertical biases are furnished from bias source 51 to the centertaps of potentiometers 35 and 33, while additional vertical biases are furnished from bias source 52 to horizontally directed electrodes in lens matrix 36 so as to properly position the electrons in a vertical direction. The connections to matrix 36 are described in greater detail in the aforementioned S. P. Newberry Ser. No. 671,353.

Both vertical biases 51 and 52 are adjusted together with the proper settings on potentiometers 35 and 33, to position electrons to move only along a radial direction with respect to disc 11 as the horizontal electron beam deflection voltages from staircase counters 53 and 54 are varied. Potentiometers 32 and 34 are preferably adjusted to so that the beams are deflected in the proper amount by electrodes 30 and 31. Thus, beam 22 impinges orthogonally upon the incident radiation receiving side of lens matrix 54, while beam 37 passes through collimating lens 27 orthogonally with respect to the plane of apertured plate 28.

Read or write signals are produced by read/write circuitry 49 of control apparatus 46 whenever it is desired to read information from disc 11 or to record information thereon. The readout operation requires a signal from read/write circuitry 49 to trigger a deflection driver circuit 55 into operation removing a deflection voltage normally supplied by driver 55 to plates 43 to maintain the incident electron beam directed toward Faraday cup 42. The deflection voltage is withheld by deflection driver 55 for the entire duration of the trigger signal, permitting the incident electron beam to move out of Faraday cup 42 and pass through the aperture in plate 25 for this entire interval. Upon expiration of this interval, deflection driver 55 restores the voltage on deflection plates 43, and the incident electron beam is again deflected to Faraday cup 42.

Motor 13 continuously drives disc 11 at a relatively high speed, typically 3,600 r.p.m., after AC power has been supplied thereto through read/write circuitry 49. Each revolution of disc 11 is precisely demarcated by a single magnetic pickup head 56 situated to detect proximity of a spot of magnetic material 57 on the underside of the disc This permits read/write circuitry 49 to initiate or halt recording or readout operation of the system at precisely determined instants. Of course, other revolution detection means may be utilized, such as optical detection apparatus, for example.

The writing or recording operation requires a sequence of signals from read/write circuitry 49 which first actuates stepper motor 17 to position magnetic transducer means 16 at a desired radial location with respect to disc 11. This is followed by actuation of input circuitry 45, so that data are recorded on disc 11 in a single band of tracks for one complete revolution of the disc. Recording is halted when magnetic pickup 56 detects proximity of magnetic material 57. Alternatively, read/write circuitry 49 may be programmed so that recording continues until a predetermined number of bands have been recorded on disc 11. This is achieved by repositioning magnetic transducer means 16 each time a single band of tracks on disc 11 has been recorded and then reinitiating recording. In such event, the disc may rotate through several revolutions without any recording operation taking place during the very brief interval in which stepper motor 17 repositions transducer means 16 radially with respect to disc 11.

Operation of the system of FIG. 1 begins when it is desired to record information on disc 11. Thus, a plurality of signals from input circuitry 45, furnished in parallel to transducer means 16, enable a plurality of tracks of data to be recorded in a single band on disc 11. Repositioning of transducer means 16 permits another band to be recorded on disc 11, adjacent the first band. This procedure continues until the disc is fully recorded or until it is desired to read either a portion or all of the data stored on the disc.

To read the stored data, read/write circuitry 49 actuates deflection driver 55 to remove the electron deflection voltage from plates 43. Incident electron beam 22 then passes through the aperture in plate 25 and is turned by magnetic field 26 so as to pass through collimating lens 27 and coarse deflection means 30 and 31 onto a predetermined lenslet of matrix 36. This lenslet is selected by the voltages across opposite ends of each of potentiometers 32, 33, 34 and 35; that is, vertical biases 51 are preset to assure that the coarse electron beam moves only radially with respect to disc 11, while a predetermined number of pulses are applied to horizontal staircase counter 53 from coarse location selection circuitry 47 to cause the counter output voltage to increase to a predetermined value. This moves the incident electron beam to a coarse predetermined radial position with respect to disc 11. The incident electron beam impinging upon lens matrix 36 is positioned by the horizontally directed deflection plates of matrix 36 along a precise radial path with respect to disc 11 in accordance with the preset voltage supplied by vertical biases 52, while a predetermined number of pulses are applied to horizontal staircase counter 54 from fine location selection circuitry 48 to cause the counter output voltage to increase to a predetermined value. This moves the incident electron beam precisely to a predetermined radial position with respect to disc 11, enabling readout of a single recorded track on the disc. The beam is reflected back by the negative voltage on film 12 of disc 11, and the reflected beam passes through the same selected lens of matrix 36 back through coarse deflection means 31 and 30 and through collimating lens 28 to magnetic field 26, where it is turned so as to impinge upon one of circumferential collection plates 38. Because of the negative potential on coating 12, the incident electron beam never actually touches the coating, and instead is reflected at a very small distance above the coating.

Both the incident and reflected electron beams, in the region close to the surface of coating 12 on disc 11, interact with the magnetic field emanating from the disc so as to be deflected essentially within a plane which is tangential with respect to disc 11. This causes reflected electron beam 37 to impinge upon one or the other of circumferential collection plates 38, depending on whether the magnetic field causing the deflection arises from a recorded binary ONE or ZERO. Incident electron beam positioning occurs at a rapid rate, so that if voltages to position the beam at a precise location are supplied within the time required for disc 11 to make but a single revolution, the incident electron beam is repositioned to the newly selected location within this time, preparatory to reading out another recorded track.

During rotation of disc 11, the magnetic field produced by the recorded binary ONES and ZEROS deflects reflected electron beam tangentially with respect to the disc, causing the beam to impinge upon one or the other of circumferential collection plates 38, depending upon whether a ONE or a ZERO has interacted magnetically with the reflected electron beam. The ONES and ZEROS detected by impingement of reflected electron beam 37 upon circumferential collection plates 38 causes differential amplifier 40 to produce data serially to output circuitry 41, such as a buffer storage, from whence it may be utilized.

After each complete revolution of disc 11, a reset signal is supplied to horizontal staircase counters 53 and 54 from coarse location selection circuitry 47 and fine location selection circuitry 48, respectively. These reset signals cause the output voltages of staircase counters 53 and 54 to return to zero preparatory to acceptance by counters 53 and 54 of new numbers of pulses from circuitry 47 and 48, respectively.

Figure 2:
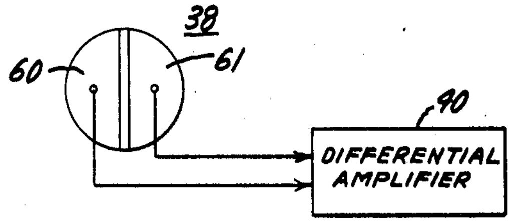
FIG. 2 is a schematic diagram of the detecting means employed to detect deflection of the reflected electron beam in the system shown in FIG. 1.

FIG. 2 illustrates the configuration of coplanar circumferential collection plates 38 shown in FIG. 1. Thus, it can be seen that, viewing the plates 60 and 61 from the side opposite the surface upon which the electron beam impinges, each one of the collection plates is connected to a separate input of differential amplifier 40. Plate 60 may comprise the ONE detection means while plate 61 may comprise the ZERO detection means for example. The polarity of output signal produced by differential amplifier 40 is indicative of the detected binary digit. Alternatively, a single one of plates 60 and 61 may be employed, together with only a conventional amplifier, in order to detect only the ONES or the ZEROS.

Figure 3:
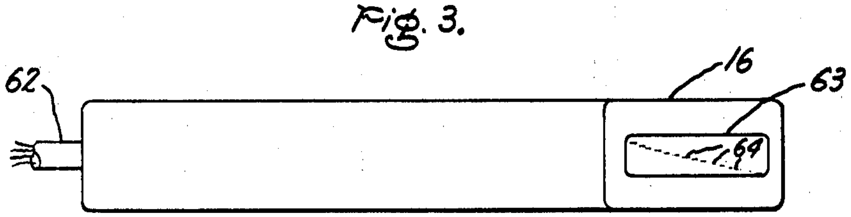
FIG. 3 is a diagrammatic illustration of the magnetic transducer means employed in the system shown in FIG. 1.

FIG. 3 illustrates the underside of magnetic transducer means 16, shown in FIG. 1. A plurality of input connections are made through a cable 62 to recording portion 63 of transducer means 16. Recording portion 63 contains a plurality of magnetic heads overlapped in stairstep fashion in order to accomplish high density recording of digital data on the magnetic disc illustrated in FIG. 1. The nonmagnetic gaps 64 of these heads are visible in recording portion 63.

Figure 4:
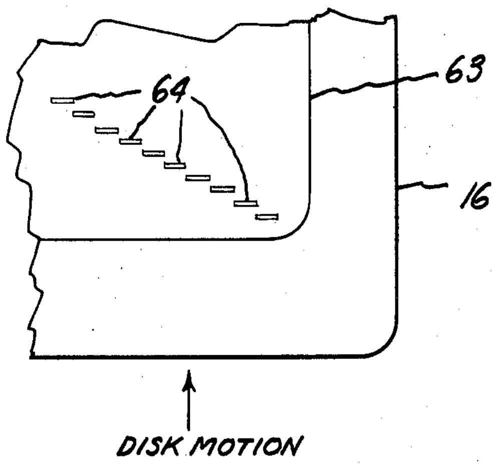
FIG. 4 is a magnified view of a portion of the magnetic transducer means shown in FIG. 3 which illustrates the stairstepped arrangement of the nonmagnetic gaps in each of the magnetic heads of the magnetic transducer means shown in FIG. 3.

FIG. 4 is an enlarged fragmentary view of magnetic transducer means 16 of FIG. 3, illustrating the arrangement of nonmagnetic gaps 64 of the magnetic heads employed in recording portion 63 of transducer means 16.

Figure 5:
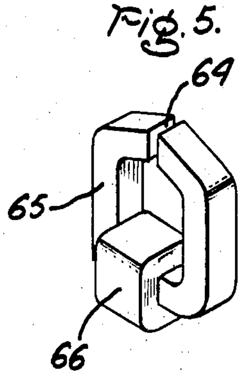
FIG. 5 is an isometric view of a single magnetic head employed in the magnetic transducer apparatus illustrated in FIG. 3.

FIG. 5 illustrates, in isometric view, a single magnetic pickup head 65 of the type employed in magnetic transducer means 16 of FIG. 4. These magnetic heads are overlapped in stairstep fashion in recording portion 63 of magnetic transducer means 16. Head 65 contains an exciting winding or coil 66 wound about core 67 to provide the energizing field across gap 64.

In order to achieve recording with accurately defined tracks, an odd number of magnetic heads are employed in recording portion 63 of transducer means 16, shown in FIGS. 3 and 4, with the first head, the last head, and every alternate intervening head being used to erase only. This is accomplished merely by furnishing steady direct current to the exciting winding on each of the heads used to erase only. Each of the even-numbered heads is used to write a track of data. The result of recording in this fashion is that a narrow guardband is left on each side of the multiple track data recorded on the magnetic disc by transducer means 16.

In order to erase the recorded tracks, it is merely necessary to furnish constant direct current to the exciting winding of each of the even-numbered heads, since the exciting winding of each of the odd-numbered heads is already energized with constant direct current. A single revolution of the magnetic disc then results in complete erasure of a band on the disc beneath the recording portion 63 of transducer means 16. By repositioning transducer means 16 at a different location along a radial path and again energizing the exciting windings of each of the heads in recording portion 63 with constant DC current, another band on the magnetic disc may be erased. By continuing this procedure, the entire disc may be erased, preparatory to recording new data thereon.

The foregoing describes apparatus for recording data magnetically at a high density and providing high speed random access retrieval of the stored data. The data may be recorded at high density simultaneously from a plurality of channels, and the data recorded from any desired one of the channels may be retrieved rapidly from storage by employment by electron mirror techniques.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. Data storage and readout apparatus comprising: a rotatable disc, said disc being coated with an electrically conductive, thin magnetic film of high coercive force:

means establishing a negative electrical bias on said film;

magnetic transducer means positioned to produce a magnetic field representing data to be stored upon the film coated on said disc;

means for directing an incident electron beam toward a portion of the film coated on said disc;

means for controllably deflecting said electron beam in a radial direction with respect to and across approximately the full radius of said disc;

said disc having an axis of rotation parallel to and displaced approximately one-half the radius of the disc from the central beam path defined by said means for controllably deflecting said electron beam; and means for detecting the position of the electron beam reflected by the electric field produced by said bias and deflected in an essentially tangential direction with respect to said disc by the magnetic field originating from said disc.

2. The data storage and readout apparatus of claim 1 including means for rotating said disc through a complete revolution while said incident electron beam is maintained directed toward a single fixed location.

3. The data storage and readout apparatus of claim 1 wherein said means for controllably deflecting said incident electron beam in a radial direction with respect to said disc includes a matrix of electron lenses and means deflecting said incident electron beam toward a predetermined lens of said matrix, said predetermined lens providing the final deflection adjustment for said incident electron beam.

4. The data storage and readout apparatus of claim 1 wherein said magnetic transducer means includes a plurality of magnetic heads arranged to radially overlap each other.

5. The data storage and readout apparatus of claim 1 wherein said means for detecting the position of the electron beam reflected by the electric field comprises a pair of coplanar, circumferential collection plates.

6. Data storage and readout apparatus comprising:

an enclosure substantially evacuated of gases, the walls of said enclosure being electrically grounded;

a rotatable magnetic recording disc situated within said enclosure at one end thereof;

means establishing a negative electrical bias on the surface of said disc;

magnetic transducer means positioned to produce a magnetic field upon said disc to magnetically store information on said disc;

a source of electrons situated in one location of said enclosure and spaced apart from said disc;

electron detecting means situated in a second location of said enclosure and spaced apart from said disc; and electron beam deflection means positioned within said enclosure between said source of electrons and said electron detecting means for deflecting said electrons along a generally T-shaped path configuration, said electron beam deflection means arranged to direct incident electrons emitted from said source through one arm and the stem of said T toward said disc and to direct electrons reflected by the negative bias on said disc through the stem and the other arm of said T toward said electron detecting means.

7. The data storage and readout apparatus of claim 6 wherein said electron beam deflection means comprises a constant magnetic field directed orthogonally with respect to the direction of travel of said incident electrons.

8. The data storage and red readout apparatus of claim 6 including means situated in said common region of said enclosure for controllably deflecting electrons in a radial direction with respect to said disc.

9. The data storage and readout apparatus of claim 8 including means for rotating said disc through a complete revolution while said means for controllably deflecting electrons in a radial direction with respect to said disc maintains a beam of incident electrons emitted from said source directed toward a single fixed location.

10 The data storage and readout apparatus of claim 9 wherein said means for controllably deflecting electrons in a radial direction with respect to said disc includes a row of electron lenses and means deflecting incident electrons directed through said common region of said enclosure by said electron beam deflection means toward a predetermined lens of said row, said predetermined lens providing a final deflection adjustment for said incident electrons.

11. A The data storage and readout apparatus of claim 8 wherein said magnetic transducer means includes a plurality of magnetic heads arranged so that the poles of adjacent heads overlap each other.

12. The data storage and readout apparatus of claim 11 including mechanical positioning means coupled to said transducer means for positioning said transducer means at any predetermined location along a radial path with respect to said disc.

13. The data storage and readout apparatus of claim 11 wherein said electron detecting means comprises a pair of circumferential electron collection plates.

14. The data storage and readout apparatus of claim 13 including differential amplifier means having a plurality of inputs, each of said inputs being connected to a separate one of said circumferential electron collection plates.

15. Data retrieval apparatus comprising:

a rotatable disc for storage of data, said disc being coated with an electrically conductive, thin magnetic film of high coercive force; said data being stored as magnetic field variations;

means establishing a negative electrical bias on said film;

means for directing an incident electron beam toward the film coated on said disc;

means for controllably deflecting said electron beam in a radial direction with respect to said disc the maximum deflection of said electron beam being approximately equal to the radius of said disc;

said disc having an axis of rotation parallel to and displaced approximately one-half the radius of the disc from the central beam path defined by said means for controllably deflecting said electron beam; and means for detecting the position of the electron beam reflected by the electric field produced by said bias and deflected in an essentially tangential direction with respect to said disc in accordance with the magnetic field configuration produced by the data recorded on said disc.

16. The data retrieval apparatus of claim 15 including means for rotating said disc through a complete revolution while said incident electron beam is maintained directed toward a single fixed location.

17. The data retrieval apparatus of claim 15 wherein said means for controllably deflecting said incident electron beam in a radial direction with respect to said disc includes a matrix of electron lenses and means deflecting said ic incident electron beam toward a predetermined lens of said matrix, said predetermined lens providing the final deflection adjustment for said incident electron beam.

18. The data retrieval apparatus of claim 15 wherein said means for detecting the position of the electron beam reflected by the electric field comprises a pair of coplanar, circumferential collection plates.